(12) United States Patent  (10) Patent No.: US 8,170,980 B1
Lulue et al.  (45) Date of Patent: May 1, 2012

(54) UNIVERSAL SOFTWARE ARCHITECTURE FOR DECISION SUPPORT

(75) Inventors: Daniel L. Lulue, San Diego, CA (US);
Glenn A. Osga, San Diego, CA (US);
Neil P. Acantilado, San Diego, CA (US);
Bryan L. Croft, San Diego, CA (US);
Jimmy C. Lam, Costa Mesa, CA (US);
Michael J. Carlin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 3188 days.

(21) Appl. No.: 10/683,250

(22) Filed: Oct. 10, 2003

Related U.S. Application Data

(60) Provisional application No. 60/417,856, filed on Oct. 11, 2002.

(51) Int. Cl.
*G06F 15/18* (2006.01)
*G06F 17/00* (2006.01)
(52) U.S. Cl. .......................................................... 706/61
(58) Field of Classification Search ................ 706/1, 15, 706/45, 61; 700/1, 90; 705/14
See application file for complete search history.

(56) References Cited

U.S. PATENT DOCUMENTS

| | | | |
|---|---|---|---|
| 5,606,695 A | 2/1997 | Dworzecki | |
| 5,838,906 A | 11/1998 | Doyle et al. | |
| 6,035,278 A | 3/2000 | Mansour | |
| 6,092,048 A | 7/2000 | Nakaoka | |
| 6,101,481 A | 8/2000 | Miller | |
| 6,507,845 B1 | 1/2003 | Cohen et al. | |
| 6,519,571 B1 * | 2/2003 | Guheen et al. | 705/14 |

OTHER PUBLICATIONS

'A human computer interface vision for naval transformation', Jun. 2003 [retrieved on Apr. 6, 2011]. Retrieved from the Internet:<URL:10.1.1.74.4184.pdf>.*
Task managed watchstanding: Providing decision support for multitask naval operations', 2001 [retrieved on Apr. 6, 2011]. Trtrieved from the Internet :<URL:10.1.1.127.2749.pdf>.*
'The application service provider market: A guide for navy line managers', Sep. 2000 [ertrieved on Apr. 6, 2011]. Retrieved from the Internet< URL:http://www.dtic.mil/cgi-bin/GetTrDoc?AD=ADA384288&Location=U2&doc=GetTRDoc.pdf>.*
'Integrating middleware software into open system client/server systems', Sep. 1995 [retrieved on Apr. 6, 2011]. Retrieved from the Internet:<URL:http://www.dtic.mil/cgi-bin/GetTRDoc?AD=ADA304230&location+U2&doc=GetTRDoc.pdf>.*

* cited by examiner

*Primary Examiner* — Kakali Chaki
*Assistant Examiner* — Peter Coughlan
(74) *Attorney, Agent, or Firm* — Ryan J. Friedl; Kyle Eppele

(57) ABSTRACT

A universal software architecture for decision support includes an n-tiered architecture for building a universal task and workload management software system. The design incorporates a connectivity tier for activating a data object representative of application specific data; a management tier for activating a workflow object in response to both the data object and application specific rules; and a presentation tier for providing a user with decision support elements responsive to said workflow object. The design may also incorporate a corporate tier for providing the application specific data and rules.

8 Claims, 11 Drawing Sheets

UNIVERSAL SOFTWARE ARCHITECTURE FOR DECISION SUPPORT

CROSS-REFERENCE TO RELATED APPLICATIONS

This application claims the benefit of U.S. Provisional Application No. 60/417,856, filed Oct. 11, 2002, herein incorporated by reference.

FEDERALLY-SPONSORED RESEARCH AND DEVELOPMENT

The universal software architecture for decision support is assigned to the United States Government and is available for licensing for commercial purposes. Licensing and technical inquiries should be directed to the Office of Patent Counsel, Space and Naval Warfare Systems Center, San Diego, Code 20012, San Diego, Calif., 92152; telephone (619) 553-3001, facsimile (619) 553-3821.

BACKGROUND OF THE INVENTION

The universal software architecture for decision support generally relates to a distributed computing architecture for supporting user supervision of an automated computing system.

Traditional Graphical User Interfaces (GUIs)

Graphical user interfaces based on a desktop metaphor dominate the commercial office-computing domain. The office GUIs are application centric and document driven, and rely on the virtual window abstraction for data entry and display. The typical GUI is composed of several basic elements. There is the Desktop, which is a virtual model of a physical office desk. Some GUIs went to the extreme of extending the metaphor by providing the desk with drawers, and the drawers with folders and dividers. Most GUIs however present the Desktop as a flat 2D surface on which various items are placed.

The emphasis of traditional Graphical User Interfaces (GUIs) is on helping a user locate information through various on-screen user interface elements such as menus and buttons. The user must understand the relationships among the various abstract objects, both on the desktop, and within individual applications. Since the applications are document based, it is the user who provides the task context and structure within which he or she interacts with the applications. Office GUIs reside on computers within both the commercial and the military domains.

In addition to their reliance on an application and document centric GUIs, current, commercial and military enterprise computer systems are also designed, built, and deployed to operate in an isolated, stand-alone mode. These systems are colloquially referred to as "stovepipe" systems. The applications that run on stovepipe enterprise systems are not generally designed to share data and information in a collaborative manner. Nor are the systems they run on easily integrated together into flexible and responsive metasystems. Furthermore, most system designs derive solely from functional requirements, and therefore seldom conform to any known software architectural standards or specifications. Finally, the majority of legacy systems display archaic, poorly designed, and data-driven GUIs to the users who must then process the data themselves to derive the features and values that are required to complete operational tasking during a normal course of work (workflow period).

The Use of Application and Window Based GUIs in Enterprise Systems

There are multiple consequences to both the military and to industry that result from past and current software system practices. The first is the burden of having to overcome each system's lack of understandability and usability through extensive personnel training. Much of this training is devoted to teaching the user to navigate and operate a system's quirky and proprietary GUI. Other training objectives involve teaching each user to perform much of the computational work that is best performed by the system but is often left to the user to do by the designers.

Other drawbacks of both legacy and current enterprise computer systems include lack of support for teaming, task and workload management. Nor do the systems attempt to separate the presentation of information from the application logic associated with processing and storing it. Most architectures are either zero tiered (flat topology), or two tiered (client-server).

The performance criteria of these systems focuses on system performance to the exclusion of human performance. The delivery of data from sensor to human is a critical performance specification, but the amount of time it takes the human to make sense of the data is ignored. Thus, a key design criteria for any system that replaces or augments current military and commercial systems is improved human performance.

Task Activities with Traditional, Legacy Systems

A user task life cycle includes the following elements:

TABLE 1

| User Task Phases | System Software Support |
| --- | --- |
| Task initiation | Event-based task triggering |
| Task orientation | Information sets |
| Task decision | Decision support aids and tools |
| Task execution | Draft and final task products |
| Task confirmation | Task step history |
| Task transition | Prioritized worklists |

Current industrial (process) and shipboard (weapon) control computer systems do not explicitly support the task states that a user transitions through during a workflow. On a Navy ship, for example, a typical Combat Information Center (CIC) is manned by teams of people working in parallel, each of whom are looking for task opportunities. There is a similar situation in industrial settings, such as power plant operation. The implicit design rationale behind current systems is that if there are enough people engaged in surveying the operational or tactical picture, all critical events will be covered (task initiation). This approach often leads to inadequate or incomplete task detection and processing due to limitations of human visual search, bias in expectations, and a narrowing of attention focus during multi-tasking and parallel tactical events.

In legacy Naval air defense systems, for example, users continuously select and inspect individual GUI display components. They must constantly initiate and orient on tasks while performing successive visual searches with accompanying cognitive processing. This in effect places the user at the beginning of the task lifecycle with a full cognitive burden of processing and filtering incoming stimuli, followed by initial decisions to launch tasks. The typical legacy system fails to support the user through these task stages.

There are similar limitations regarding system support for the balance of the user task lifecycle where decision support tools are lacking or non-existent, draft products are not produced, confirmation and drill-down displays are not provided, and user transition to the next task is unsupported. Fully automated systems often only provide the user with a yes/no option with regard to finishing or executing the task. There is no opportunity for the user to seek confirmation that the task products are indeed correct. Nor is it possible for the user to inspect the automated system's process or its intermediate results. The user may be "in the loop", but it is at the end of the loop, and his or her options are limited.

SUMMARY OF THE INVENTION

The present invention provides a universal software architecture for decision support that addresses the problems mentioned previously.

In one aspect of the invention, a distributed computing architecture for supporting user supervision of an automated computing system includes: a connectivity tier for activating a data object representative of application specific data; a management tier for activating a workflow object in response to both the data object and an application specific rule; and a presentation tier for providing a user with a decision support element responsive to said workflow object.

In another aspect of the invention, a computer program product (CPP) includes a machine-readable recording medium and a first, second, and third instruction means, wherein the CPP utilizes a distributed computing architecture for supporting user supervision of an automated computing system. The first, second, and third instruction means are recorded on the medium for directing the automated computer system to initiate: (1) a connectivity tier for activating a data object representative of application specific data; (2) a management tier, coupled to said connectivity tier, for activating a workflow object in response to both the data object and an application specific rule; and (3) a presentation tier, coupled to the management tier, for providing a user with a decision support element responsive to the workflow object.

BRIEF DESCRIPTION OF THE DRAWINGS

FIG. 9b is an architectural block diagram of the client task management component of the client object depicted in FIG. 9a.

FIG. 9c is an architectural block diagram of the situational awareness component of the client object depicted in FIG. 9a.

FIG. 9d is an architectural block diagram of the decision support component of the client object depicted in FIG. 9a.

DESCRIPTION OF SOME EMBODIMENTS

Figure 1:
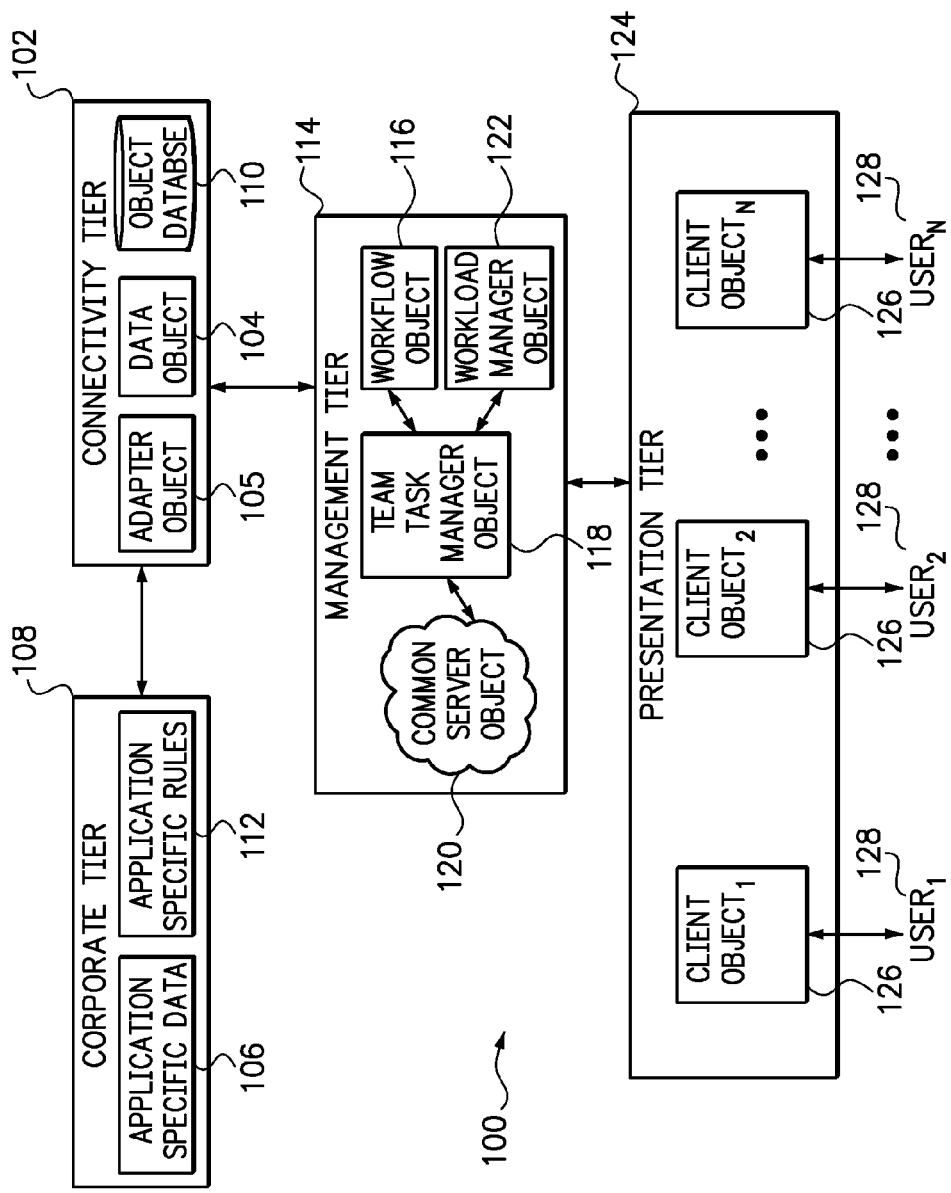
FIG. 1 is an architectural block diagram of an automated computer system in accordance with the universal software architecture for decision support.

FIG. 1 depicts an architectural block diagram of a distributed computing architecture 100 for supporting user supervision of an automated computing system. Architecture 100 optionally includes a corporate tier 108 for providing application specific data 106 and application specific rules 112. Corporate tier 108 encapsulates any legacy system or sensors necessary to provide the needed data for an application specific task.

The term "Task" refers to a unit of physical and mental work that a user has been assigned to perform, usually during a workflow period. A task is also a definable process by which human and machine cooperate at achieving a work related goal. The goal may be to produce a defined product such as an: order, report, message, plan, etc. or the goal may be to 'update' the human processor—the cognitive 'work buffer'.

Tasks are defined by the process of putting defined labels on a set of work activities. The labels must make sense to designer and subject expert, and be explainable and defendable to software engineers and management. A task label is defined as a "verb-noun" phrase for consistency. Task Verbs such as "prepare, check, deliver, review, order, issue, etc." are descriptive of the type of work being performed. The task "noun" indicates the product of the task (e.g. "Maintenance Report", "Current System Status").

The process of task definition requires a clear focus on defining task products during the initial task analysis phase of the system design process. "Products" are preferably defined first or early in the task definition stage. If a product cannot be clearly defined, the task concept may be a candidate for being "reduced" to a task "step" or "subtask" within another defined task area. Fewer tasks relate to a more manageable design problem, software effort, and user training effort. Smaller tasks relate to easier training in a "progressive building of skills" fashion. The ability to combine smaller task products into larger outcomes also facilitates training and instruction. Thus, task definition at the highest level, breakdown of the job design into a set of job tasks, requires careful analysis of the impact of the size, scope, duration, and relatedness of the task group on training, learning, job pacing, and production of task products.

A "task" has the following attributes:
1. A task is a goal-oriented work activity.
2. A task may vary in time from seconds to hours.
3. A task is supportable by computer-based aids, (e.g. not work activities such as physically connecting hoses or cleaning and maintenance, although such tasks could benefit by some of the principles of this design).

4. Work completed by a task is supportable by various levels of automation, which are in some cases user selectable and in others may be fixed.

Thus, levels of task supervision and user/system task sharing are dynamic.

Architecture 100 is also shown in FIG. 1, as including a connectivity tier 102 for activating a data object that is representative of application specific data 106. Data object 104 is an object-oriented abstraction of application specific data 106 received from corporate tier 108 or other legacy systems. Abstraction of application specific data 106 may be completed by a separate connector object residing in connectivity tier 102 or it may be incorporated into adapter object 105. Connectivity tier 102 optionally includes object database 110 for storing a plurality of data objects 104.

Also, optionally included in connectivity tier 102 is an adapter object 105. Adapter object 105 primarily interfaces with a legacy system for accepting and requesting of application specific data 106. Functional abstraction with adapter object 105 allows architecture 100 to be easily portable to multiple legacy systems while still maintaining a consistent workflow of tasks throughout the computer system.

Management tier 114, as shown in FIG. 1, is coupled to connectivity tier 102, for activating and assigning workflow objects 116 in response to data object 104 and an application specific rule 112. By way of example, management tier 114 may also activate and assign workflow objects 116 in response to input from user 128. Such a request from user 128 might include a request for more application specific data 106 from the legacy system or it may include a request to reschedule or delay a workflow object for another time.

Workflow object 116 is an object-oriented abstraction of the activities involved in performing the assigned task. Each Workflow object 116 has a context, a goal, and a sequence of actions required to accomplish the goal. The context is defined as the collection of objects that represents all of the factors relevant to a tasking. A goal is defined as a software representation of human intention—usually a set of conditions representing an end state of specific objects in the problem domain (e.g., inventory maintenance). The end-state determines whether the goal is met. The actions are captured in the object's methods (behaviors) and data (attributes).

Figure 2:
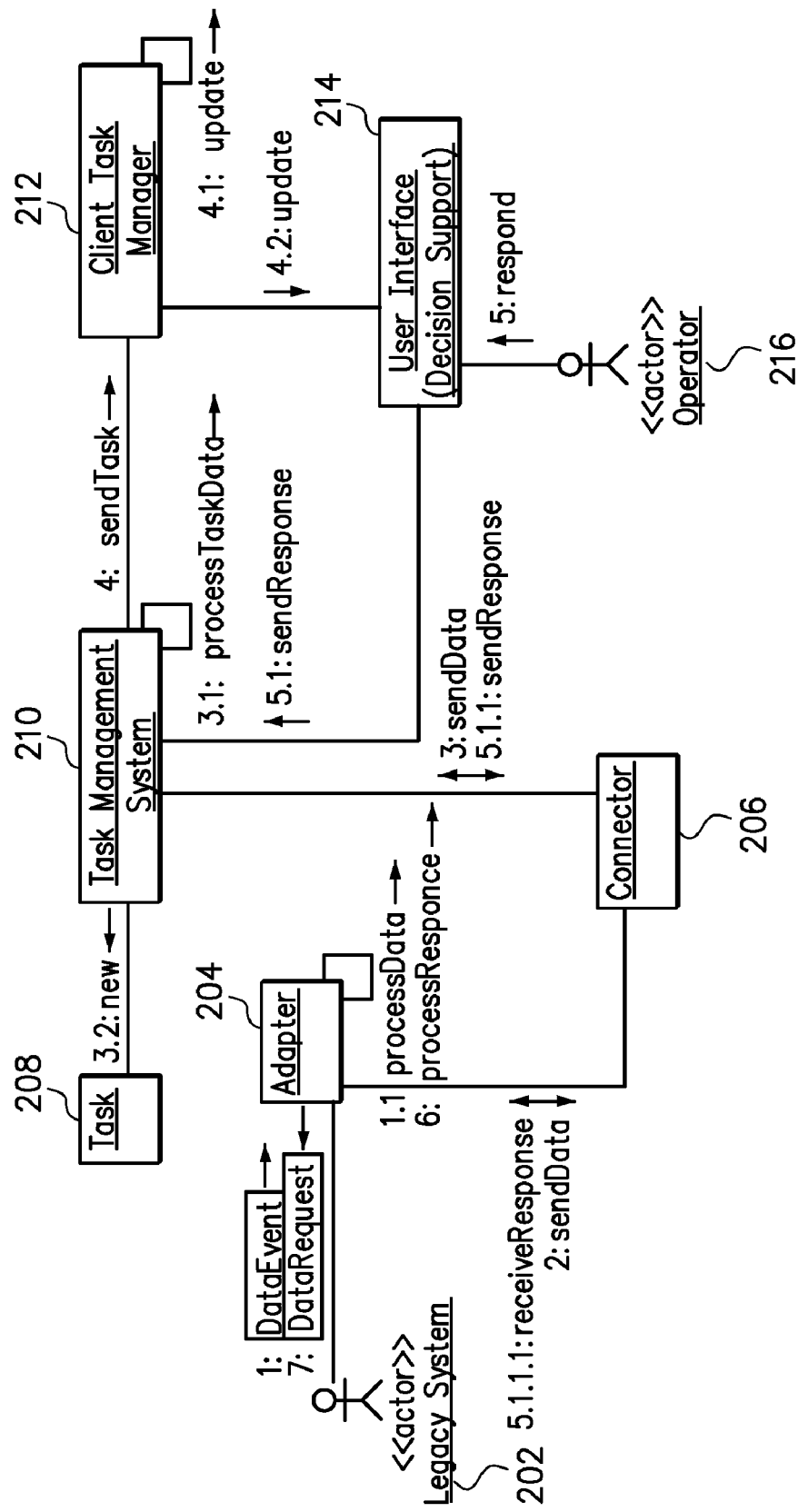
FIG. 2 is a static structure diagram of an automated computer system in accordance with the universal software architecture for decision support.
Figure 3:
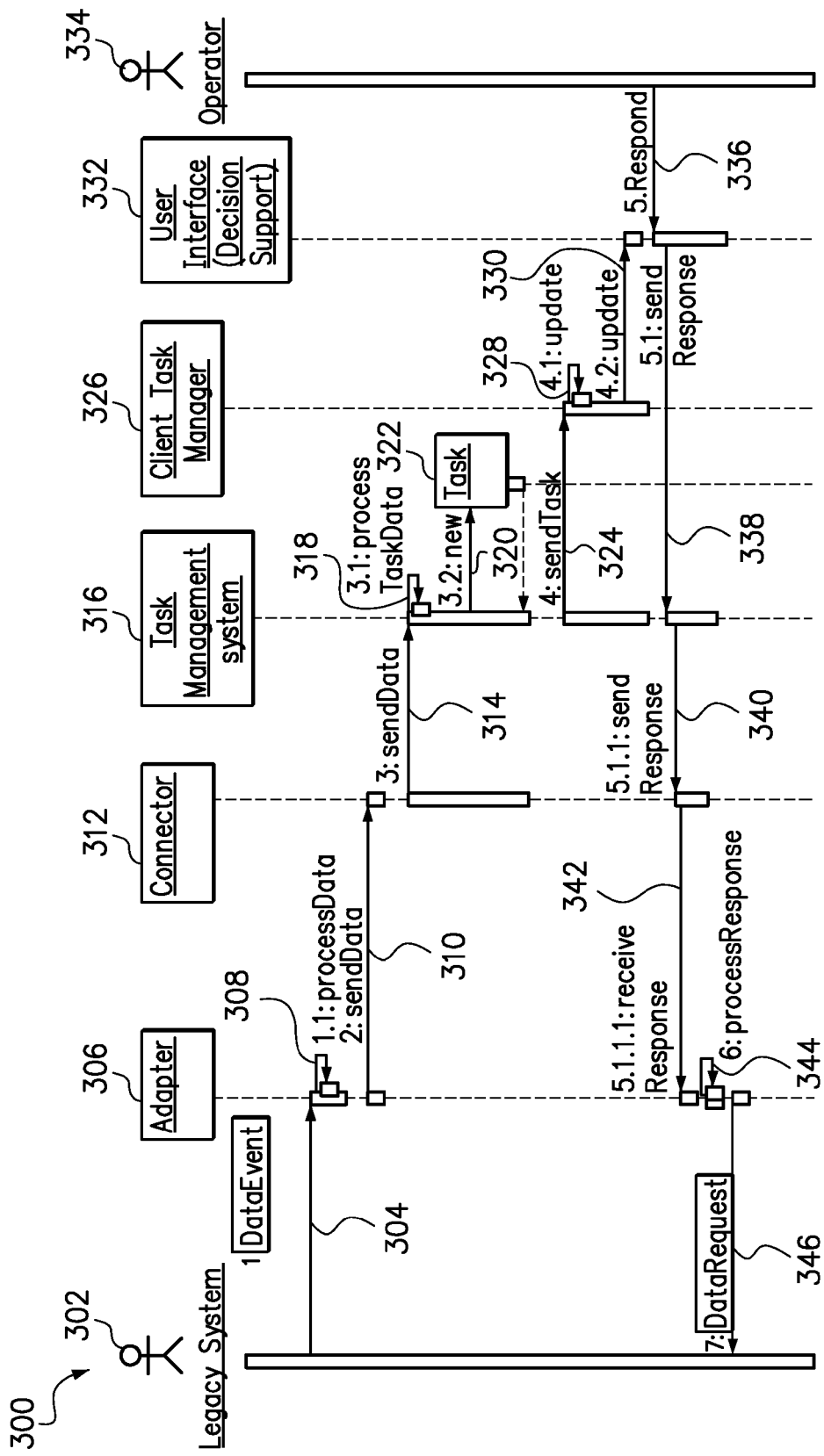
FIG. 3 is an event trace showing a flow of data in accordance with the universal software architecture for decision support.
Figure 4:
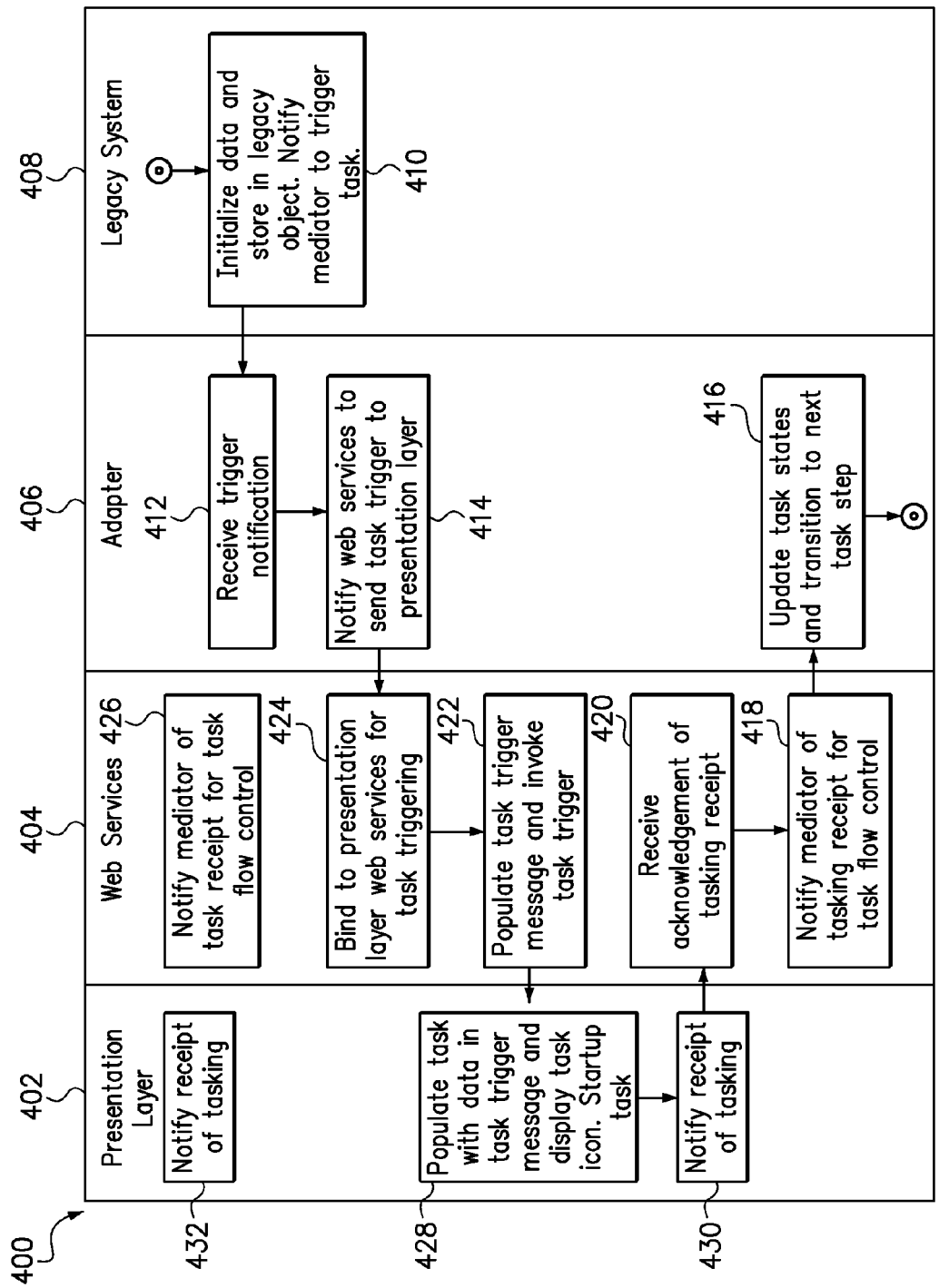
FIG. 4 is a flow-chart illustrating the operation of a connectivity tier, in accordance with the universal software architecture for decision support.
Figure 5:
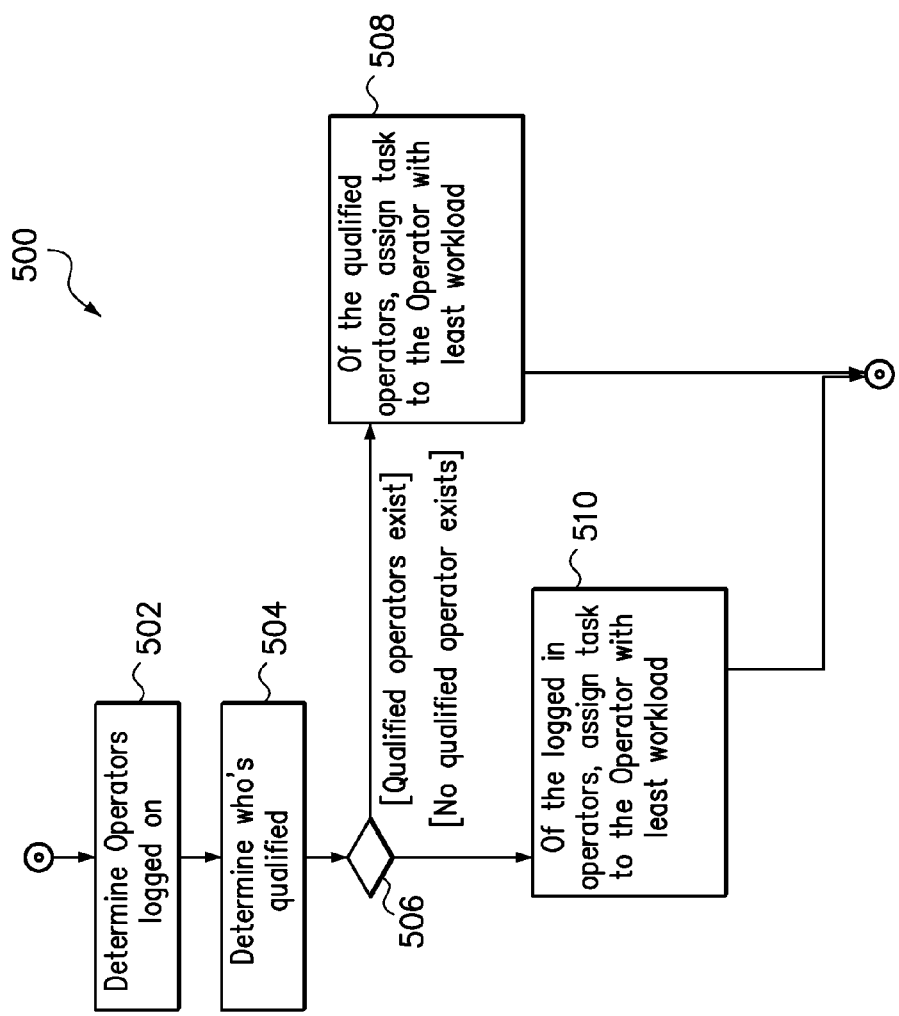
FIG. 5 is a flow-chart illustrating the operation of a team task manager object, in accordance with the universal software architecture for decision support.
Figure 6:
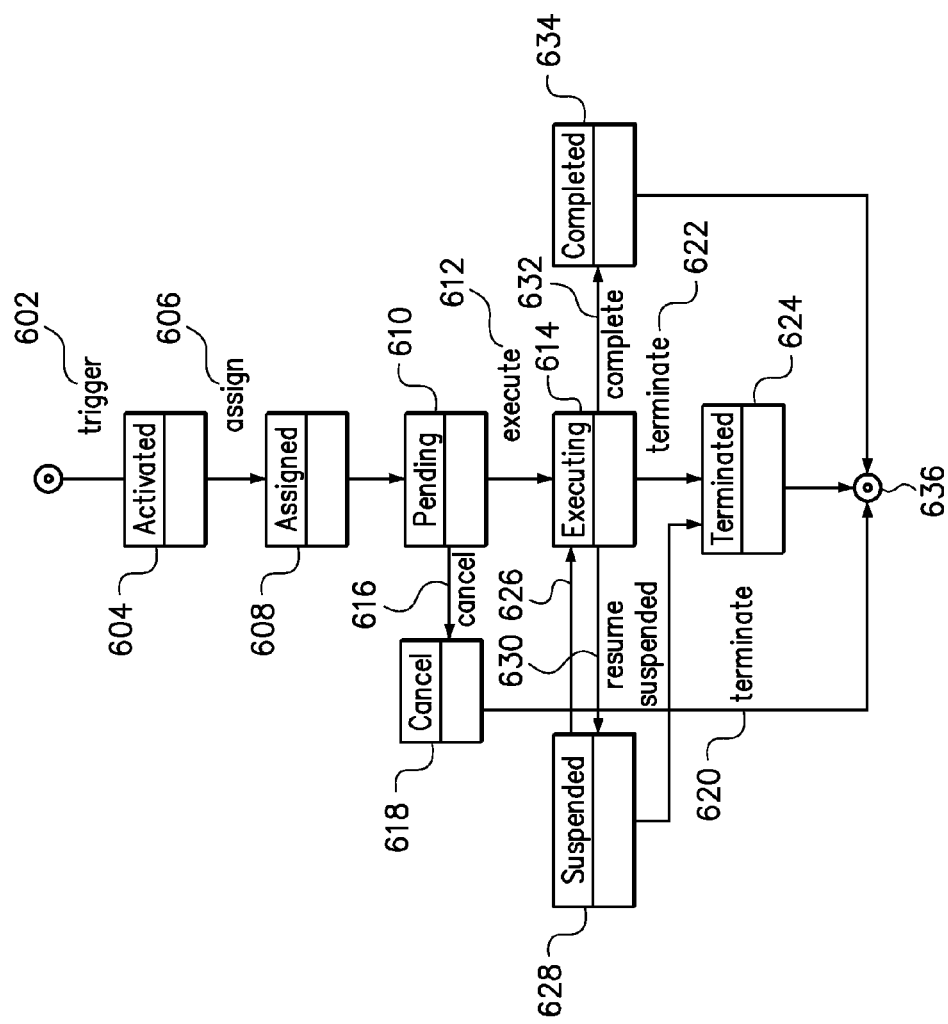
FIG. 6 illustrates the lifecycle of a workflow object, in accordance with the universal software architecture for decision support.
Figure 7:
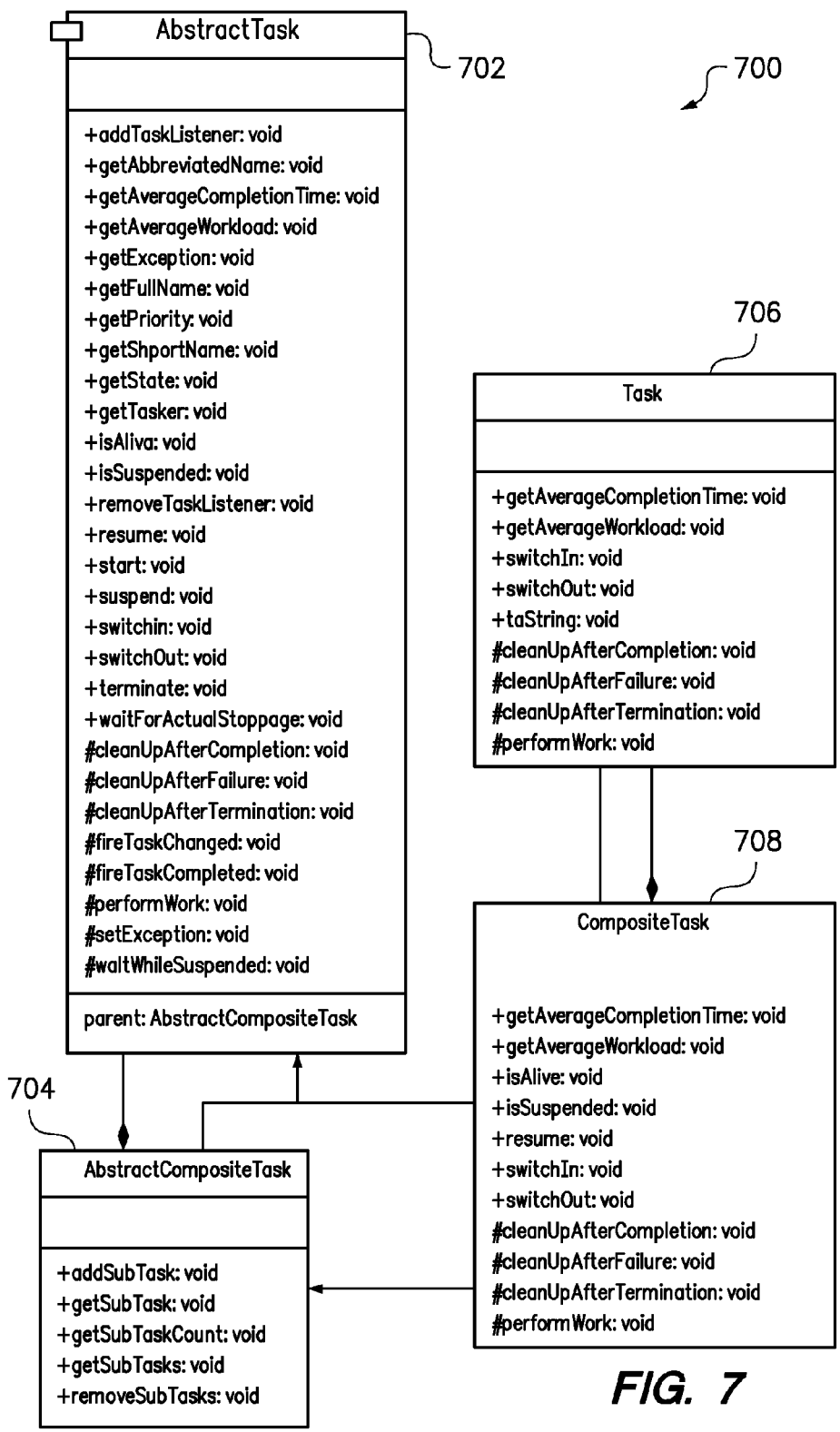
FIG. 7 is an object model defining the static structure of a workflow object, in accordance with the universal software architecture for decision support.
Figure 8:
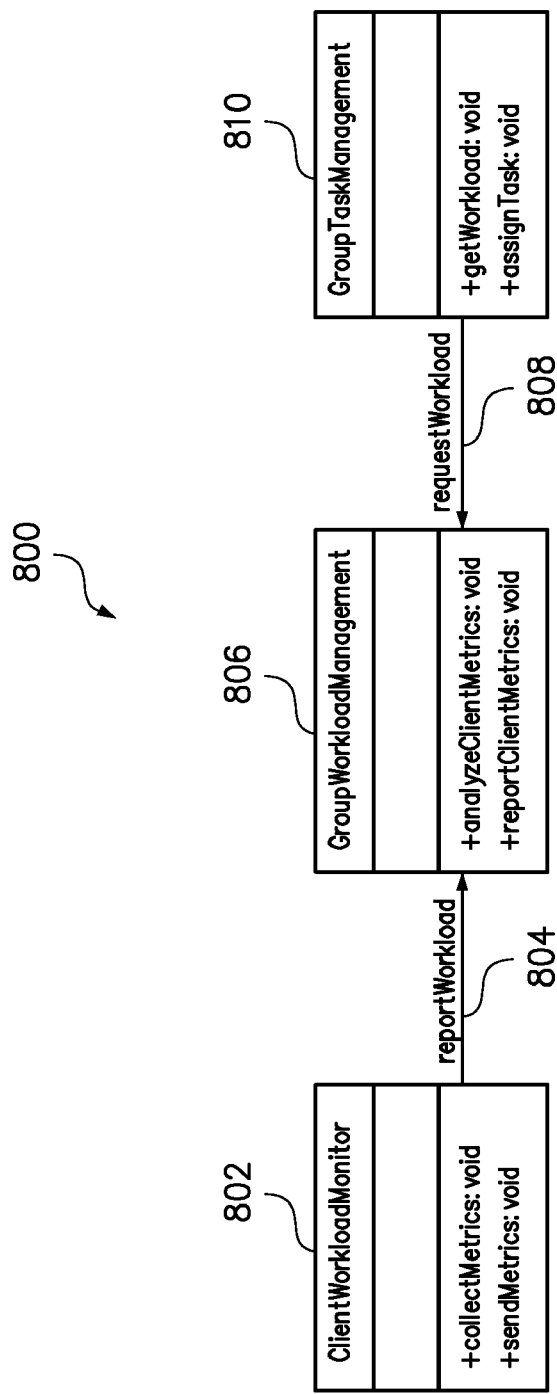
FIG. 8 is an object model defining the static structure of a workload manager object, in accordance with the universal software architecture for decision support.

The logic (code) that makes up workflow object 116 methods are derived from task analyses performed on the activities that occur during a course of work. An executing task distributes work between the "system" and the human operator. For example, the system may detect an information need, connect to a database, and get the information. The operator, in turn, may review the information, make a decision, or request alternative courses of action from the system. Once a decision is made, the system, under direction of workflow object 116, performs the action. The workflow model is described in artifacts such as requirements documents and static and dynamic Unified Modeling language (UML) diagrams including the following: CASE diagrams, Activity diagrams, Sequence and collaboration diagrams, Static structure (class) diagrams, and Deployment diagrams. Examples of such UML diagrams are depicted in FIGS. 2-3, where FIG. 2 is a static structure diagram of an automated computer system in accordance with the universal software architecture for decision support and FIG. 3 is an event trace showing a flow of data in accordance with the universal software architecture for decision support.

Referring back to FIG. 1, included in management tier 114 is team task manager (TTM) object 118. TTM object 118 manages workflow object 116 through its life cycle, which includes the following stages:
1. Initialization: System services required by a Task or Task Family are identified and accessed.
2. Activation: A triggering event has been detected or received. Workflow object 116 is instantiated and placed in a shared object space. By way of example, shared object space, is depicted in architecture 100 as common server object 120.
3. Assignment: Depending on the implementation technology, this state may be combined with the Activation state. The "best fit" client object 126 is identified, and workflow object 116 is assigned to a client object 126.
4. Execution: Workflow object 116 starts executing on the client object 126. Alternatively, workflow object 116 could execute within management tier 114 in a thin-client implementation.
5. Completion and Retirement: If workflow object 116 is implemented as a session object it is then destroyed. If workflow object 116 is implemented as an entity object, its state is preserved.
6. Transition: The TTM object participates in transitioning the workflow from completed workflow object 116 to the next task.

TTM object 118 has an association with workload manager object 122 that "advises" the TTM object as to which client object 126 to assign workflow object 116, based on user workload data. Such workload data may include system information such as, which users are logged onto the system, which users are qualified to perform the specified task, and which users have the smallest existing workload. In addition, other well-known methodologies for managing workloads in a task-based system may be implemented.

Presentation tier 124 is also included in architecture 100 for providing users 128 with decision support elements responsive to assigned workflow objects 116 and to user input. Presentation tier 124 may include a plurality of client objects 126, each for presenting decision support elements to users 128 to aid in user 128 supervision of the automated computing system. Client objects 126 are more particularly detailed in FIGS. 9a-9d, as is more fully described below.

Figure 9A:
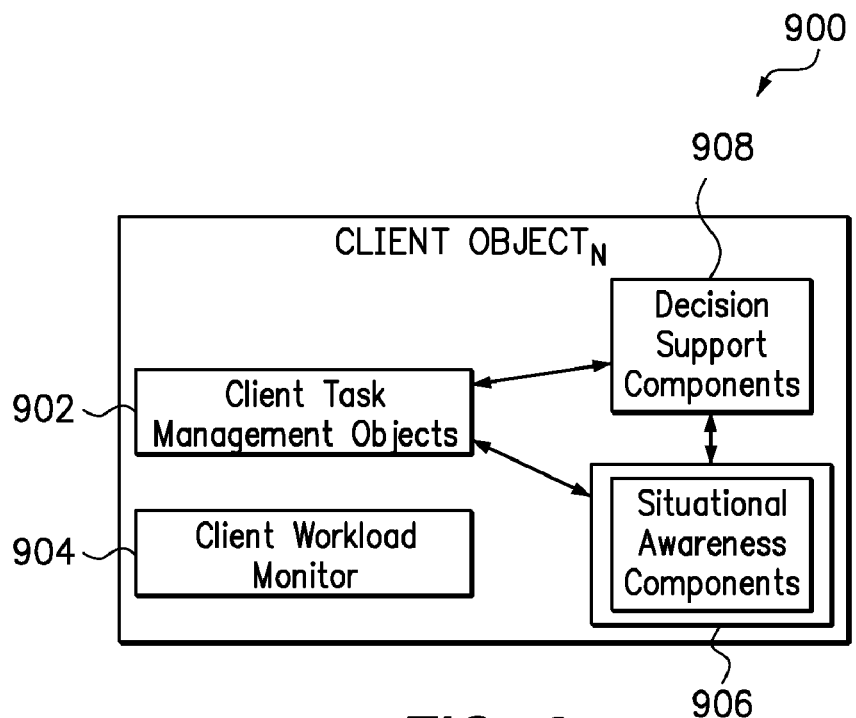
FIG. 9a is an architectural block diagram of a client object, in accordance with the universal software architecture for decision support.

Referring now to FIG. 9a, client object 900 includes client task management objects 902, client workload monitor object 904, decision support components 908, and situational awareness components 906.

Figure 9B:
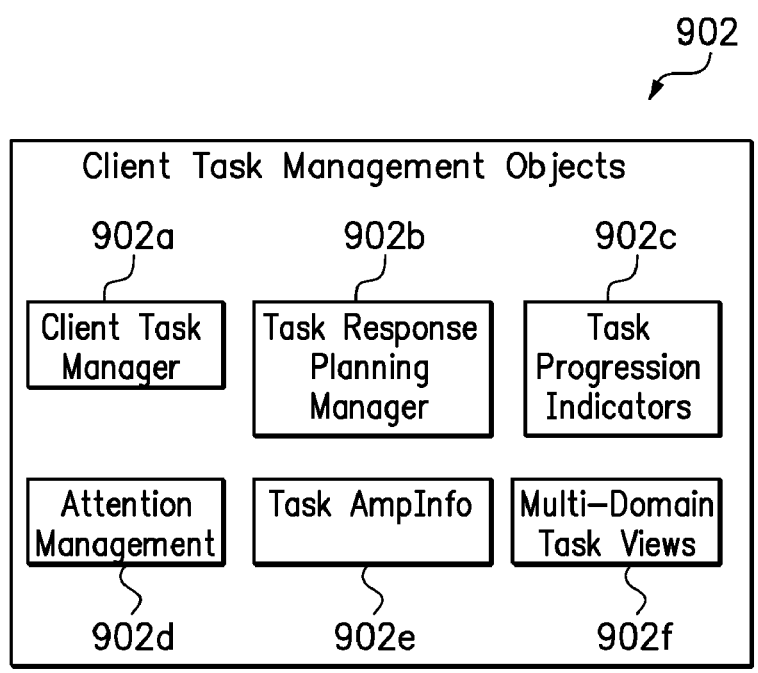

Client task management 902 includes various objects that execute on the client object, that are responsible for local task management and reporting of task status to the TTM object 118. By way of example, FIG. 9b shows, in detail, various client task management objects 902 that may be utilized.

Client task manager object 902a runs on client object 900 and manages workflow objects 116 running on client object 900. Client task manager 902a also updates the visual display of the user and communicates workflow object 116 status to the workgroup manager object 118. Client task manager object 902a removes the workflow object 116 from the shared object space 120 on behalf of its client object 126, and workflow object 116 starts executing on the client object 126. Alternatively, in a thin-client implementation, workflow object 116 could execute elsewhere besides on the client object, such as in management tier 114.

Up to this point, the executing logic of architecture 100 is confined to general task management procedures and principles. The domain-specific logic that supports decision-making and supervisory control is contained in individual Workflow objects 116. When a workflow object 116 executes, it performs software activities on behalf of the task the operator is engaged in. The activities include the following:

1. Updating the client task manager view.
2. Writing into the decision-aid views (basis of assessment 908a, amplifying Information 902e).
3. Updating and filtering the interactive graphical region 906a display, monitoring back-end progress and reporting it to the operator, presenting the task products to the operator for disposition.

Once workflow object 116 completes, the client task manager 902a retires it to the shared object space 120 for disposition. Workflow object 116 may be stored, destroyed, or restarted with new initial conditions.

Referring again to FIG. 9b, task response planning manager 902b, maintains, displays, and updates the various steps that may be involved in workflow object 116.

Task progression indicators 902c are a subcomponent of task response planning manager 902b that communicate workflow step states.

Attention management object 902d is responsible for updating the visual display, such that the user's attention is directed to critical events that may be indicated by workflow object 116.

Task amplifying information (AmpInfo) object 902e provides additional information about any user-selected interactive object on the visual display.

Multi-domain task views 902f, are part of the HCI, including tabular panes that enable the user to see their entire task set across task families. In the human computer interface (HCI) context, a "task" is the iconic, on-screen representation of workflow object 116.

Situational awareness components 906 are client components that provide visual displays that enable the user to maintain a continuous understanding of the events occurring in the application specific environment. By way of example, FIG. 9c shows, in detail, various situational awareness components 906 that may be utilized.

Figure 9C:
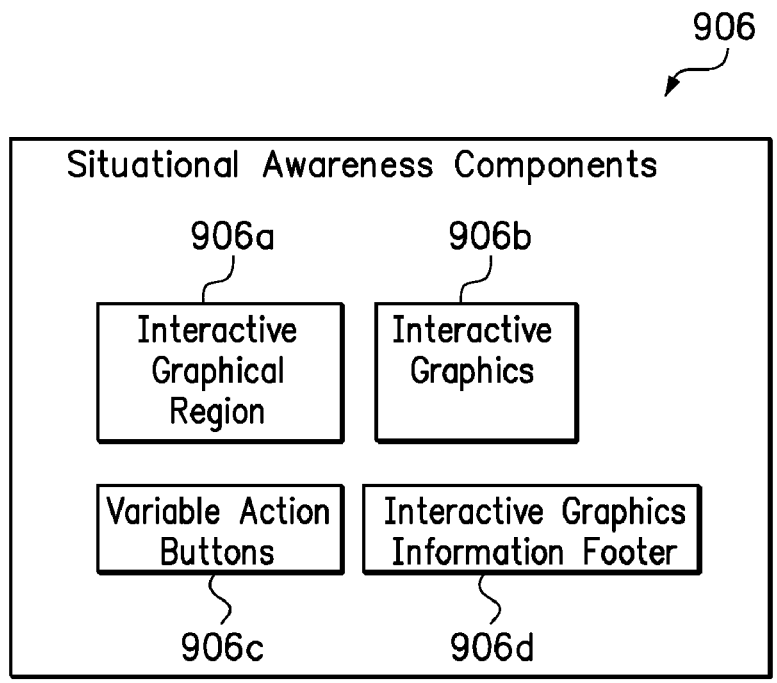

Now referring to FIG. 9c, interactive graphical region 906a displays data and objects in the application specific environment that are relevant to the workflow object 116. Additional information about a user-selected object is displayed in AmpInfo object 902e.

Interactive graphics 906b provides a visual mechanism by which the user can select a graphical object to get additional or amplifying information.

Variable action buttons 906c provide user interface elements that control the situational awareness views of the visual display.

Tactical information footer 906d provides visual information to the user about items that are selected or "rolled-over" in the interactive graphical region 906a.

Decision support components 908 are client components that provide visual display data that supports workflow-context decision making by the user. By way of example, FIG. 9d shows, in detail, various decision support components 908 that may be utilized.

Figure 9D:
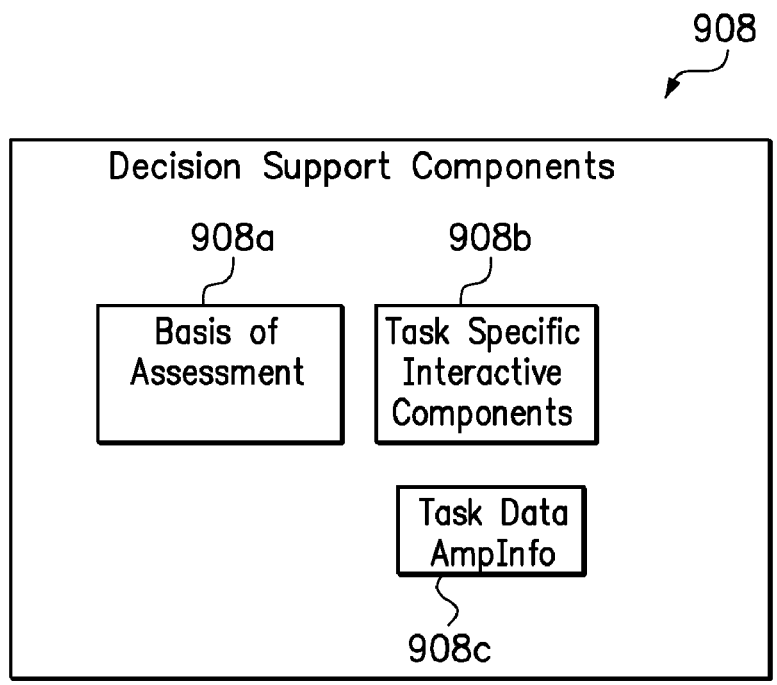

Now referring to FIG. 9d, basis of assessment component 908a provides a visual display of an evaluation or an assessment made by the legacy system. This display provides the user the opportunity to understand how an assessment was arrived at by the legacy system.

Task specific interactive components 908b provides specialized, domain-dependent interactive graphical components.

Task data amplifying information component 908c displays amplifying information about the assessments displayed in basis of assessment component 908a.

Figure 10:
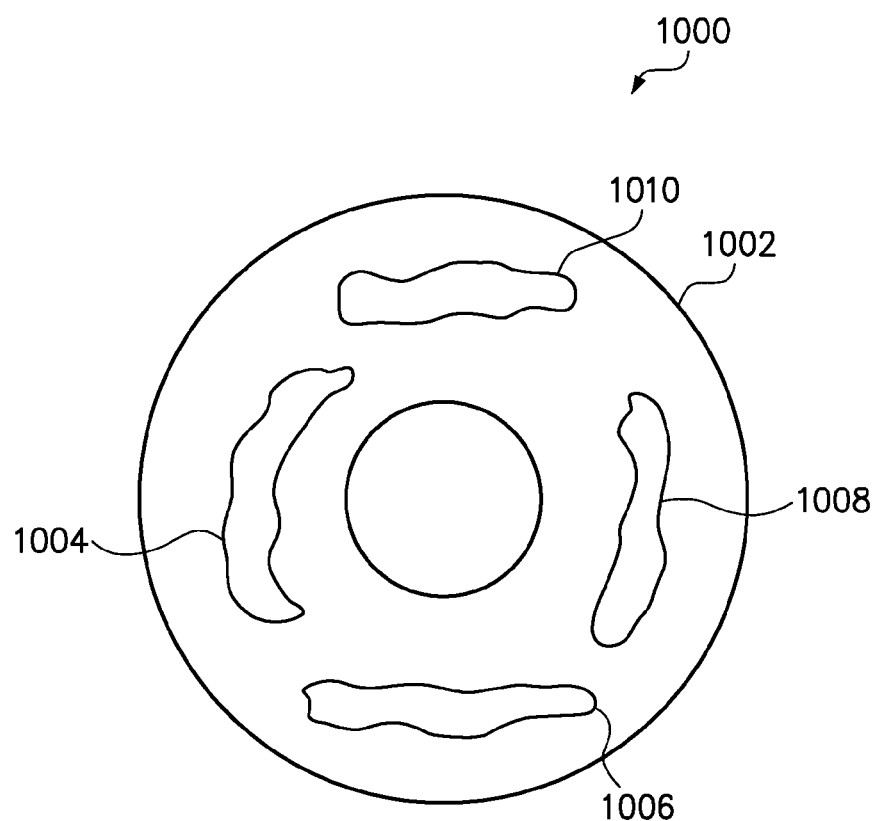
FIG. 10 shows a computer program product (CPP), in accordance with the universal software architecture for decision support.

FIG. 10 illustrates a computer program product 1000 utilizing a distributed computing architecture for support user supervision of an automated computing system. The CPP includes a machine-readable recording medium 1002, whereby machine executable instruction means 1004, 1006, 1008, and 1010 are recorded on medium 1002 for directing an automated computer system.

Optional instruction means 1010 are for directing the automated computer system to initiate a corporate tier for providing application specific data and application specific rules. The corporate tier encapsulates any legacy system or sensors necessary to provide the needed data for an application specific task.

Instruction means 1004 are for directing the automated computer system to initiate a connectivity tier for activating a data object that is representative of application specific data. The data object is an object-oriented abstraction of application the specific data received from the corporate tier or other legacy systems. Abstraction of the application specific data may be completed by a separate connector object residing in the connectivity tier or it may be incorporated into an adapter object. The connectivity tier optionally includes an object database for storing a plurality of the data objects.

Also, optionally included in the connectivity tier is the adapter object. The adapter object primarily interfaces with a legacy system for accepting and requesting of application specific data. Functional abstraction with the adapter object allows the distributed computing architecture to be easily portable to multiple legacy systems while still maintaining a consistent workflow of tasks throughout the computer system.

Instruction means 1006 are for directing the automated computer system to initiate a management tier, coupled to the connectivity tier, for activating and assigning workflow objects in response to the data object and application specific rules. By way of example, the management tier may also activate and assign the workflow objects in response to input from user. Such a request from the user might include a request for more application specific data from the legacy system or it may include a request to reschedule or delay a workflow object for another time.

Instruction means 1008 are for directing the automated computer system to initiate a presentation tier for providing users with decision support elements responsive to assigned workflow objects and to user input. The presentation tier may include a plurality of client objects, each for presenting decision support elements to users to aid in user supervision of the automated computing system. Examples of decision support elements in accordance with the universal software architecture for decision support are given above.

Optionally included in CPP 1000 are further instruction means for directing the automated computer system to perform the following steps: initialize a workflow entity in response to application specific system requirements; activate a workflow object in response to the application specific data and an application specific rule; assign the workflow object to a client object in the presentation tier; execute the workflow object; and retire the workflow object for disposition.

We claim:

1. A computer program product (CPP) utilizing a distributed computing architecture for supporting user supervision of an automated computing system, said CPP comprising:
   a machine-readable recording medium;

first instruction means, recorded on said medium, for directing said automated computer system to initiate a connectivity tier for activating a data object representative of application specific data, said data object being an object-oriented abstraction of the application specific data;

second instruction means, recorded on said medium, for directing said automated computer system to initiate a management tier, coupled to said connectivity tier, for activating a workflow object in response to said data object and an application specific rule, said workflow object being an object-oriented abstraction of activities involved in performing an assigned task, said workflow object including a context, a goal, and a sequence of actions required to accomplish the goal;

third instruction means, recorded on said medium, for directing said automated computer system to initiate a presentation tier, coupled to said management tier, for providing a user with a decision support elements responsive to said workflow object and user input, said presentation tier including a plurality of client objects for presenting the decision support elements to users; and fourth instruction means, recorded on said medium, for directing said automated computer system to initiate a corporate tier, coupled to said connectivity tier, for providing said application specific data and said application specific rule.

2. The CPP, as in claim 1, wherein said client objects include client task management objects, client workload monitor objects, decision support components, and situational awareness components.

3. The CPP, as in claim 1, wherein said instruction means further direct said automated computer system to:
  initialize a workflow entity in response to application specific system requirements;
  activate a workflow object in response to said application specific data and an application specific rule;
  assign said workflow object to one of said client objects in said presentation tier;
  execute said workflow object; and
  retire said workflow object for disposition.

4. The CPP, as in claim 3, wherein said workflow object is executed by said client object.

5. The CPP, as in claim 3, wherein said workflow object is executed in said management tier.

6. The CPP, as in claim 3, wherein said "activate" step includes instantiating and placing said workflow object in a shared object space.

7. The CPP, as in claim 3, wherein said "assign" step includes moving said workflow object from said shared object space to said client object.

8. The CPP, as in claim 3, wherein said "retire" step includes moving said task entity from said client object to said shared object space.

* * * * *